Dec. 12, 1939.                L. ZAIGER                2,183,438
                          AUTOMOBILE BUMPER
                         Filed March 4, 1939
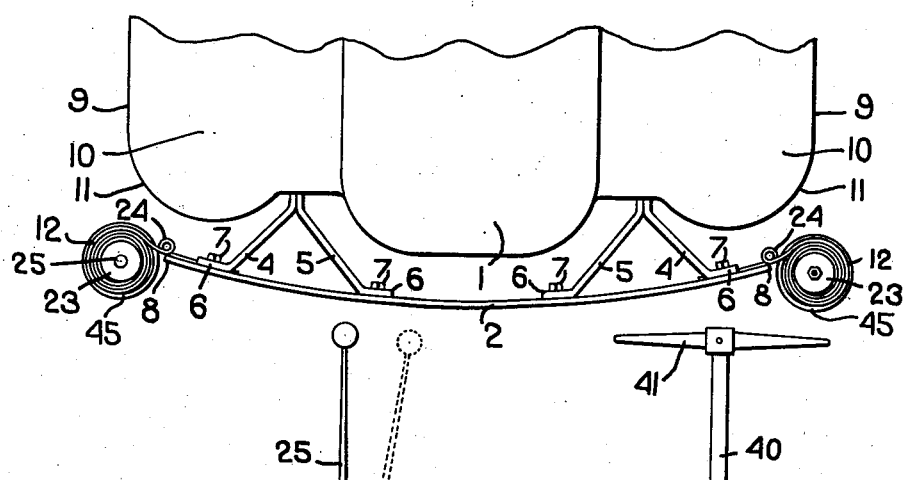
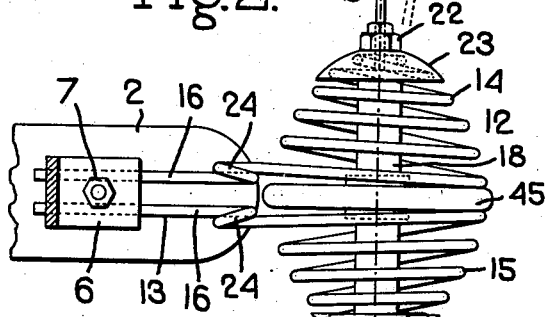
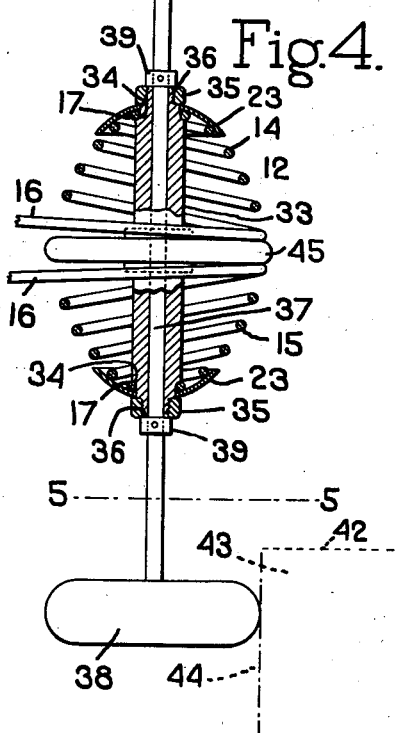
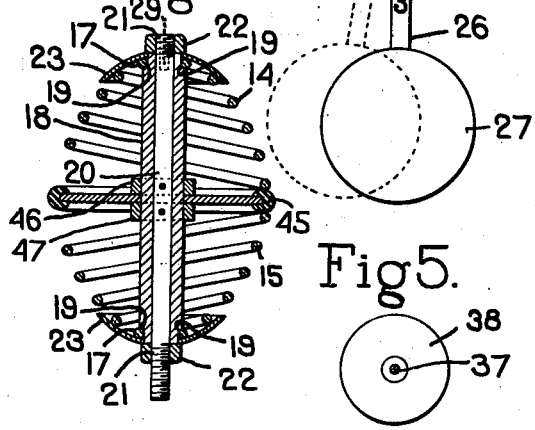
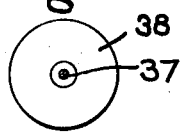
Inventor.
Louis Zaiger
by Heard Smith & Tennant
                    Attys.

Patented Dec. 12, 1939

2,183,438

UNITED STATES PATENT OFFICE 2,183,438

AUTOMOBILE BUMPER

Louis Zaiger, Lynn, Mass.

Application March 4, 1939, Serial No. 259,822

13 Claims. (Cl. 293—55)

This invention relates to bumpers for automobiles and has for one of its objects to provide a bumper extension adapted to be secured to the bumper of an automobile to give added protection to the fenders.

In many makes of automobiles the bumper terminates slightly short of the outside marginal line of fenders so that the fenders are not thoroughly protected. As a result, when a person is manipulating his car in a restricted space, he is apt to mar the fender of the car by bringing the unprotected outer portion thereof into contact with another car or some other object.

My improvement obviates this danger by providing a bumper extension which can be secured to any bumper and which projects outwardly beyond the bumper sufficiently to give the desired added protection to the fenders.

A further object of the invention is to provide a bumper extension with means to indicate to the driver of the car when the car is approaching the curb. This is of marked assistance to the car driver when he is backing his car into a parking place parallel to the curb because it indicates to the driver when the rear wheels of his car have nearly reached the curb, thus giving him an indication when to cut his front wheels in order to bring the car into parallelism with the curb.

With these objects in view, the invention consists in the features hereinafter described and then pointed out in the claims.

In the drawing:

Fig. 1 shows in plan view the front end of an automobile with its front bumper equipped with my improved bumper extension;

Fig. 2 is a view of one end of the bumper showing the bumper extension adapted thereto, said view looking at the front bumper from the rear;

Fig. 3 is a section through the bumper extension on the line 3—3, Fig. 2;

Fig. 4 is a view similar to Fig. 2 but showing the body of the bumper extension partly in section and also showing a different form of parking indicator;

Fig. 5 is a reduced section on the line 5—5, Fig. 4.

In Fig. 1 there is shown in outline the front portion of an automobile 1, said automobile having the usual front bumper presenting an impact bar 2. This bumper may be secured to the automobile in any usual way, and as herein illustrated, it is supported by bracket arms 4, 5, that extend from the automobile frame, each arm having at its outer end a laterally bent foot portion 6 which overlies the inside face of the bumper or impact bar 2 and is bolted thereto by a bolt 7.

As indicated in Fig. 1, the ends 8 of the bumper impact bar 2 are located a short distance inside of the outer marginal edge 9 of the front fenders 10, this being a feature which is found in many makes of automobiles.

When the bumper 2 is shorter than the distance between the marginal edges 9 of the two fenders 10, the portion 11 of the fenders is not thoroughly protected, and in manipulating the automobile in a very restricted space, it frequently happens that the driver will so steer the car that while the end 8 of the bumper will clear an obstruction, the portion 11 of the fender may be brought into engagement with the obstruction, thereby marring the fender.

As stated above, my present invention provides a bumper extension which can be secured to the bumper or some other portion of any automobile, and which not only adds to the length of the bumper, but provides a bumper end which is generally circular in cross-section and which, therefore, cannot be caught or hooked onto the end of the bumper of another car, or cannot be caught onto any stationary obstruction when the car is moving in a restricted area.

My improved bumper extension is shown as having a general T shape and comprises a body portion 12, preferably having a general globular shape, and a stem portion 13 by which the extension is secured to the bumper 2. The body portion 12 preferably has a resilient character so that it will yield somewhat when it engages an object, and the stem 13 is constructed to provide a resilient or yielding connection between the body portion 12 and the bumper 2, thereby permitting the body to yield when it is brought into contact with another object.

While the body portion 12 may be made in various ways without departing from the invention, I have illustrated herein a construction wherein the said body portion is formed by a coil or coils of spring wire. The body 12 is made in two sections, an upper section 14 and a lower section 15. Each section is formed by a tapered helical coil of spring wire, one end 16 of the wire from which the coil is formed constituting one section of the stem 13. The two tapered helical coils 14 and 15 are arranged in axial alinement with their larger ends adjacent each other, and this produces a generally globular-shaped body 12. The two coils 14 and 15 are connected by a tie member which extends axially through the coils and to which the small end turns 17 of the coils are connected. This tie member is shown as comprising a sleeve 18 having at each end a shoulder 19 forming a seat for the small end coil 17, and a rod 20 which extends through the sleeve 18 and has its ends screw-threaded as shown at 21, such screw-threaded ends having nuts 22 screw-threaded thereto. 23 indicate caps which enclose the smaller end turns of the coils and which are clamped against the coils by the nuts 22. The tightening of the nuts 22 clamps the caps 23 and the small end turns 17 of the coils against the shoulders 19 and thus the two coils are firmly connected together.

The two sections 16 of the stem 13 will be secured to the bumper 2 in any approved way. One convenient way is to clamp the ends of the stem sections 16 between the foot 6 of the bumper-supporting bracket and the inside face of the bumper, as shown in Figs. 1 and 2, and if desired, the foot 6 may be provided with grooves to receive the stem sections 16. These generally globular body portions 12 not only add to the over-all length of the bumper and thus give added protection to the fenders, but because of their circular shape in cross section, they present convexly rounded exterior surfaces which will easily wipe or slide by any obstruction with which they may be brought in contact, and will not hook onto such obstructions as the tip end 8 of the front bumper is apt to do when the car is moving backwardly and the tip end of the rear bumper is apt to do when the car is moving forwardly.

It should, perhaps, be remarked that while I have illustrated my invention as applied to the front bumper of an automobile, yet it is to be understood that similar bumper extensions may be secured to the ends of the rear bumper.

Owing to the helical shape of the coils 14 and 15 the body 12 is more or less resilient, and the stem 13 is preferably so constructed that it will have certain resilient or yielding qualities, thereby providing a resilient or yielding connection between the body and the bumper 2. This is accomplished herein by providing each section of the stem 16 with a loop 24. The wire itself is resilient, but the provision of the loop 24 imports increased yielding qualities to the connection between the body 12 and the bumper.

The caps 23 serve not only to enclose the smaller turns of the helical coils, but they may be so made as to add a decorative finish to the completed article. In the device above described, the body portion of the extension comprises two coils and each coil has a stem section extending therefrom by which it is secured to the bumper, and while I have shown the coils and the stem sections as made of spring wire, yet these coils and stem sections might be made of any other resilient material in wire or ribbon form without departing from the invention. It is not necessary either that the coils should have the tapered helical shape as a coil of the volute shape would still be within my invention.

I may, if desired, provide each body section with a contact disk or member rotatable about the axis of the coil or coils and having a diameter at least as great as that of the coils. With this construction, the rotatable member will be the part which contacts with any obstruction and as the car moves past the obstruction, such rotatable member will have a rolling contact therewith. If the obstruction is another automobile, this rolling contact will prevent injury to the finish of the other car.

Where the body portion is made of two coils, I propose to place this rolling contact member between the coils. In the drawings, such rolling contact member is shown at 45 and is in the form of a disk which is freely rotatable on the sleeve 18 or 33 and is located between the two coils. This rolling member 45 is held in position on the sleeve 18 or 33 between two collars 46, 47 that are fast on the sleeve.

The disk 45 may be made of any suitable material but will preferably have a peripheral portion of yielding material such as rubber.

Another feature of my invention relates to indicating means associated with the head 12 of the bumper extension by which indication will be given to the driver of the automobile when his wheels are approaching a curb. Such indicating means is of marked assistance in helping a driver to manipulate his car into a restricted parking space along side of a curb.

Such indicating means is herein shown as an indicating rod 25 which extends upwardly from the body 12, and a feeler member 26 that extends downwardly from the body 12 to a point below the upper surface of a street curb. The feeler 26 is shown as having an enlarged lower end 22, said feeler being in the form of a stem 28 and a ball-shaped lower end 27. If when a car is being manipulated into a parking space by a curb, the ball portion 27 engages the curb, the resilient character of the body 12 and stem 13 will permit the body and stem to be distorted, thereby throwing the indicator 25 into an inclined position, as shown by dotted lines, Fig. 2. When the driver of the car observes that the indicating member 25 has been thrown out of its vertical position, he knows that his wheels are approaching the curb and he can guide the automobile accordingly.

The indicating rod 25 and the feeler member 26 may be made integral with the rod 20 or may be made detachable therefrom without departing from the invention. In the construction illustrated, the indicator rod 25 and the feeler 26 are detachably secured to the rod 20, so that they may be removed when their use is not desired. The rod 20 is shown as having a tapped hole 29 in its upper end and the rod 25 will be provided at its lower end with exterior screw threads so that said rod may be screwed into the tapped hole, thereby providing for removal of the indicator rod.

The stem 28 of the feeler 26 is shown as having a head 30 at its upper end which is provided with a tapped hole 31 to receive the screw-threaded lower end of the rod 20. 32 indicates a lock nut which may be used to lock the feeler to the rod 20.

In Figs. 4 and 5, I have shown a slightly different embodiment of the invention wherein the indicating rod is rotatably mounted in the body 12 of the bumper extension. In this embodiment, the body 12 is formed of the tapered helical coils 14 and 15 as in the construction shown in Figs. 2 and 3.

The connecting member by which the coils are connected comprises a sleeve 33 having the shoulders 34 against which the small end turns 17 of the helical coils are seated, said coils being held in place by the nuts 35 which are screw-threaded to the reduced portions 36 of the sleeve 33.

Extending axially through the sleeve 33 is a rod 37 which depends below the body 12 for a considerable distance, and which has a disk 38 on its lower end, said disk preferably being either made of rubber or at least provided with a rubber peripheral surface. The rod 37 is held from axial movement in the sleeve 33 by two collars 39 which are fast thereon, said rod extending above the body 12 for a considerable distance, as shown at 40. The upper end of the rod carries some suitable indicating member 41.

In this construction the rod 37 is freely rotatable within the sleeve 33, and the disk or wheel 38 is situated far enough below the body 12 so that it will be below the upper surface 42 of the curbing 43.

The manner of mounting this rod 37 in the body 12 places the rod outside of the automobile wheels and outside of the hub caps.

If, therefore, an automobile is driving close to the curb, the disk or wheel 38 will engage the vertical face 44 of the curb before the wheels strike the curb, and as soon as the disk 38 does strike the face of the curb, then the movement of the car along the curb will cause the disk to rotate, thereby rotating the rod 37 and causing the indicating element 41 to rotate. The rotation of the indicating element 41 will thus indicate to the driver of the car that he is close to the curb but not close enough for the wheels or hub caps to engage the curb, and he can then steer his automobile accordingly.

This device is of especial advantage in places where the street curbing 43 is high enough to strike the hub cap in case the wheel is close to the curb.

While I have herein shown the stem portion of the bumper extension as secured directly to the bumper 2, yet it would be within my invention to secure the stem to one of the brackets 4, 5, or some other part of the automobile as long as the body portion of the device were situated so as to protect the portions 11 of the fenders.

While I have illustrated herein some selected embodiments of the invention, I do not wish to be limited to the construction shown.

I claim:

1. The combination with an automobile having a bumper element such as constitutes standard equipment for automobiles and comprising an impact bar, of a T-shaped extension for the bumper element which is separate structurally therefrom and comprises a resilient stem portion and a body portion extending transversely to the stem portion and having a generally rounded exterior surface extending the length thereof, and means to secure the stem portion to the bumper adjacent one end thereof and in a position extending parallel thereto and with the body portion extending vertically immediately beyond the end of the bumper and in alinement therewith, the vertical dimension of the body being considerably greater than that of the impact bar, whereby said body extends considerably above the impact bar.

2. The combination with an automobile having a bumper element such as constitutes standard equipment for automobiles, of a T-shaped extension for the bumper element which is separate structurally therefrom and comprises a resilient stem portion and a body portion extending transversely to the stem portion at one end thereof, said body portion being substantially circular in cross section, and means to support the extension with its stem portion in a position extending parallel to the bumper element and with the body portion extending vertically immediately beyond the end of said bumper element.

3. The combination with an automobile bumper element such as constitutes standard equipment for automobiles, of an extension for the bumper element which is separate structurally therefrom and comprises a resilient stem portion and a body portion at one end of the stem portion, said body portion being formed of a coil of wire having its axis extending transversely to the stem, and means to secure the stem portion of the extension to the bumper element in a position extending parallel thereto and with the body portion situated immediately beyond the end of the bumper element and extending vertically.

4. The combination with an automobile having a bumper element such as constitutes standard equipment for automobiles, of an extension for the bumper element which is separate structurally therefrom and comprises a horizontal resilient stem portion and a vertically extending body portion at one end of the stem portion, which body portion is circular in cross-section, and means securing the stem portion to the bumper element with the body portion situated immediately beyond the end of the bumper element but in line therewith.

5. The combination with the bumper of an automobile, of an extension therefor comprising a body portion and a stem portion, said body portion being made of two helical coils of wire arranged with their larger ends adjacent each other, means extending axially through the coils and connecting the end turns thereof, and means for securing the stem portion to the bumper of an automobile.

6. The combination with the bumper of an automobile, of an extension therefor comprising a body portion and a stem portion, said body portion being made of two helical coils of wire arranged with their larger ends adjacent each other, a sleeve extending axially through the coils and connected to the end turns thereof, and an indicating rod carried by the sleeve, one end of the indicating rod extending above the body and the other projecting below the body and constituting a curb-engaging feeler.

7. The combination with the bumper of an automobile, of an extension therefor comprising a body portion and a stem portion, said body portion being made of two helical coils of wire arranged with their larger ends adjacent each other, a sleeve extending axially through the coils and connected to the end turns thereof, and an indicating rod extending through and rotatably mounted in said sleeve, said rod extending above the body portion and having an indicator mounted on the upper end thereof and also extending below the body portion and provided at its lower end with a curb-engaging disk.

8. A device of the class described comprising an automobile bumper, an extension therefor presenting a body portion and a resilient stem portion, means to secure the stem portion to the bumper with the body portion extending beyond the end thereof, a rod extending vertically through and rotatably mounted in said body portion, said rod depending below the body portion, and a curb-engaging disk secured to the lower end of the rod and adapted to roll along the vertical face of a curb when the car is moving close to the curb, thereby to rotate the rod.

9. A device of the class described comprising an automobile bumper, an extension therefor presenting a body portion and a resilient stem portion, means to secure the stem portion to the bumper with the body portion extending beyond the end thereof, a rod extending vertically through and rotatably mounted in said body portion, said rod having an indicator at its upper end and the lower end of the rod depending below the body, and a wheel secured to the lower depending end of the rod and adapted to engage and roll along the vertical face of a curbing when the car is moving adjacent the curb, thereby causing rotation of the rod and the indicating member.

10. A device of the class described comprising an automobile bumper, an extension therefor presenting a body portion and a resilient stem portion, means to secure the resilient stem portion to the bumper with the body portion projecting beyond the end thereof, and a roll rotatably carried by the body portion to turn freely about a vertical axis, the diameter of the roll being at least as great as that of the body portion.

11. In a device of the character described, the combination with a bumper of an automobile, of an extension therefor comprising a body portion and a stem portion made from a length of resilient material, a portion of said length being formed into a coil to constitute the body portion of the extension, and a roll rotatably carried by said coil and having a diameter at least as great as that of the coil.

12. In a device of the character described, the combination with a bumper of an automobile, of an extension therefor comprising a body portion and a stem portion made from a length of resilient material, a portion of said length being formed into a coil having a vertical axis, which coil constitutes the body portion of the extension, means for securing the stem portions to the bumper with the body portion projecting beyond the end of the bumper, and a roll mounted on said body portion for rotation about its axis, said roll having a diameter at least as great as that of the coil.

13. In a device of the class described, the combination with an automobile bumper, of an extension therefor having two sections, each section being formed of a length of resilient material, a portion of which is bent into a coil and the remaining portion of which constitutes a stem, means for securing the stem portions to the bumper with the coils projecting beyond the end of the bumper, said coils being arranged coaxially, means connecting said coils, and a roll rotatably mounted on the connecting means and situated between the coils, said roll having a diameter at least as great as that of the coils.

LOUIS ZAIGER.